(12) United States Patent
Buch

(10) Patent No.: US 6,805,403 B2
(45) Date of Patent: Oct. 19, 2004

(54) FACILITATE SLEEPING OF A PERSON IN SITTING POSITION BY SUPPORTING THE HEAD AND/OR BODY

(76) Inventor: Pradip Chandrakant Buch, 5439 Central Ave., Western Springs, IL (US) 60558

( * ) Notice: Subject to any disclaimer, the term of this patent is extended or adjusted under 35 U.S.C. 154(b) by 0 days.

(21) Appl. No.: 10/328,992

(22) Filed: Dec. 26, 2002

(65) Prior Publication Data
US 2004/0124685 A1 Jul. 1, 2004

(51) Int. Cl.[7] ............................................. A47B 23/00
(52) U.S. Cl. .................. 297/146; 297/164; 297/188.05; 108/44
(58) Field of Search ................................ 297/146, 164, 297/188.04, 188.05, 188.06, 393, 397, 464, 163; 108/44

(56) References Cited

U.S. PATENT DOCUMENTS

| | | | | |
|---|---|---|---|---|
| 2,619,395 A | * | 11/1952 | Kent ........................... | 297/146 |
| 2,649,144 A | * | 8/1953 | Stephens ..................... | 297/164 |
| 3,050,355 A | * | 8/1962 | Hess et al. .................. | 297/163 |
| 3,625,161 A | * | 12/1971 | Rosner ......................... | 108/44 |
| 4,161,946 A | * | 7/1979 | Zuesse ......................... | 602/36 |
| 4,182,322 A | * | 1/1980 | Miller ............................ | 5/637 |
| 4,205,670 A | * | 6/1980 | Owens ......................... | 128/875 |
| 4,339,151 A | * | 7/1982 | Riggs ........................... | 297/464 |
| 4,707,031 A | * | 11/1987 | Meistrell ..................... | 297/393 |
| 5,314,404 A | * | 5/1994 | Boughner et al. ............ | 602/17 |
| 5,370,060 A | * | 12/1994 | Wang ........................... | 108/44 |
| 5,378,042 A | * | 1/1995 | Daneshvar .................. | 297/393 |
| 5,505,523 A | * | 4/1996 | Wang .......................... | 297/393 |
| 5,611,601 A | * | 3/1997 | Cowgur ....................... | 297/393 |
| 5,613,736 A | * | 3/1997 | Schaked et al. ............ | 297/397 |
| 5,645,319 A | * | 7/1997 | Parks, Jr. ..................... | 297/391 |
| 5,904,405 A | * | 5/1999 | Wu .............................. | 297/391 |
| 5,947,033 A | * | 9/1999 | Lombardo ............. | 297/188.04 |
| 5,975,638 A | * | 11/1999 | Schreiner ..................... | 297/398 |
| 6,231,535 B1 | * | 5/2001 | Mainiero et al. ............. | 602/18 |
| 6,266,825 B1 | * | 7/2001 | Floyd ............................ | 2/338 |
| 6,502,900 B1 | * | 1/2003 | Johnston ................ | 297/188.06 |
| 6,601,804 B2 | * | 8/2003 | Bisch .......................... | 248/118 |
| 6,607,241 B2 | * | 8/2003 | Johnston ................ | 297/188.06 |
| 2003/0193220 A1 | * | 10/2003 | Jensen ........................ | 297/146 |

* cited by examiner

Primary Examiner—Peter R. Brown

(57) ABSTRACT

The invention facilitates Sleeping in sitting position by supporting and/or the body (torso) of a person in various positions. This invention combines one or more of: straps, sound barrier, light barrier, Headrest and backrest to improve the Sleeping.

3 Claims, 5 Drawing Sheets

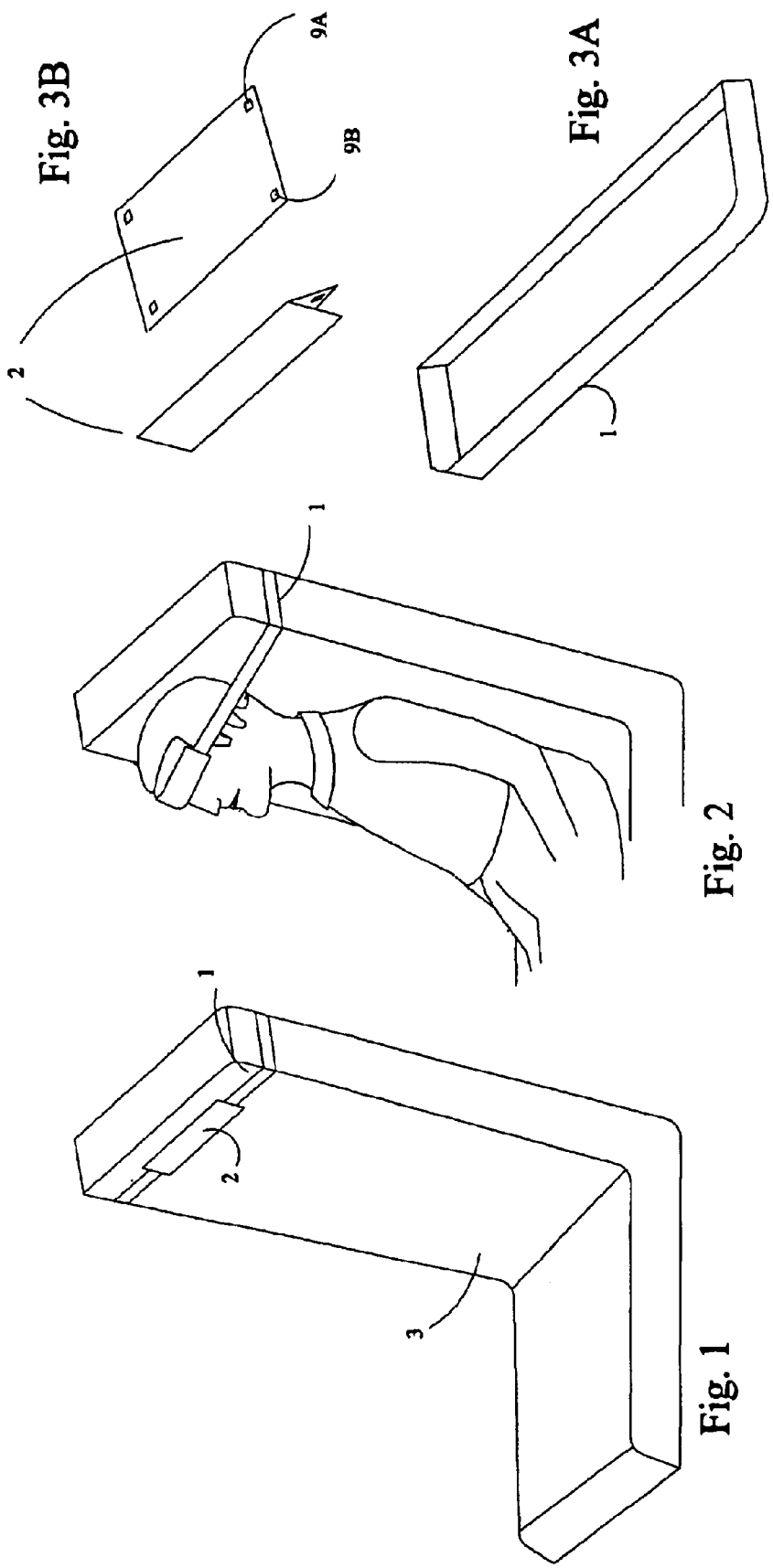

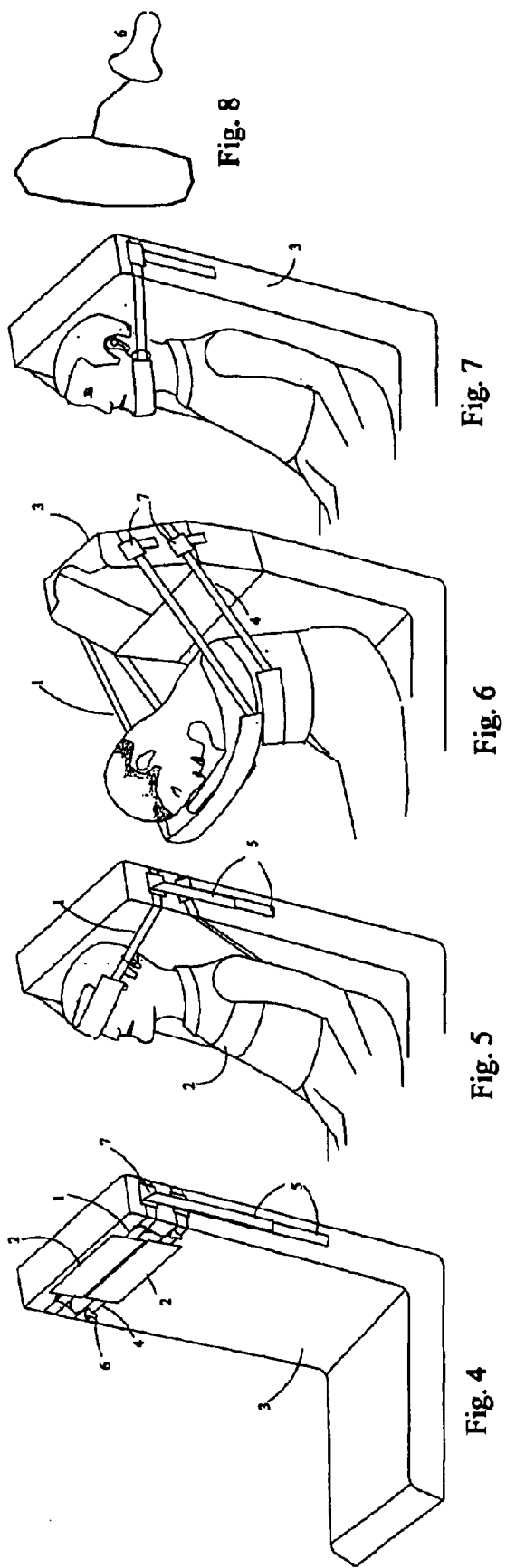

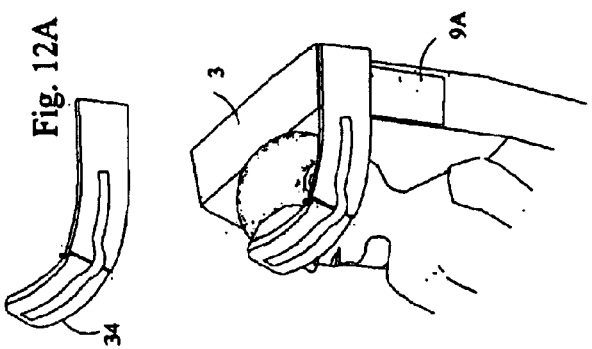
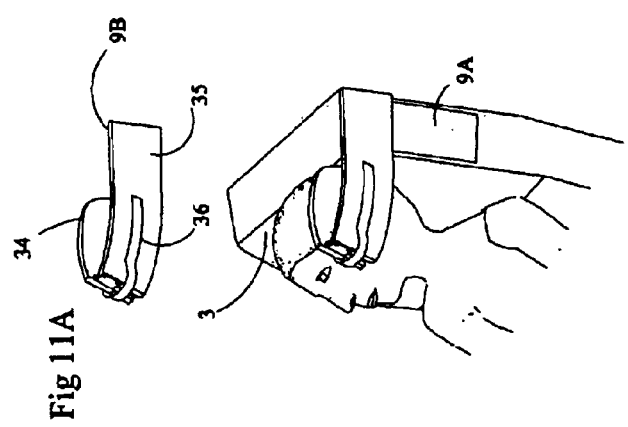
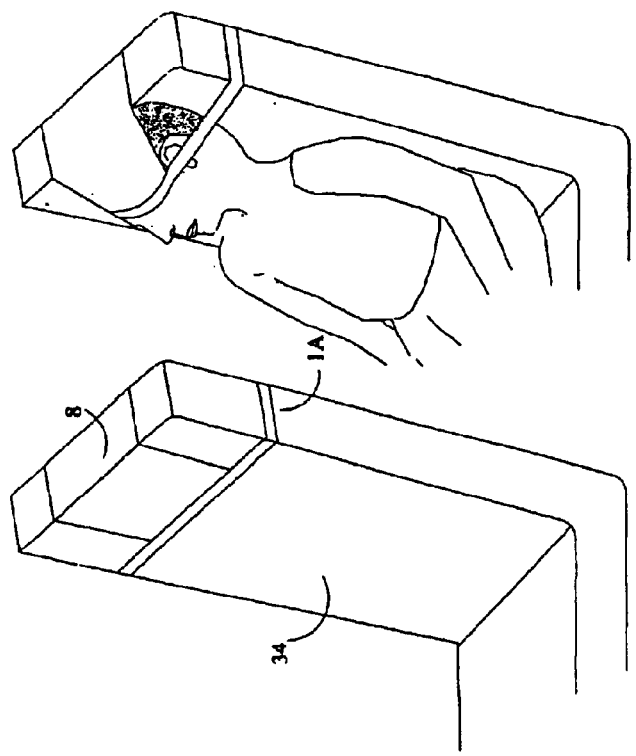

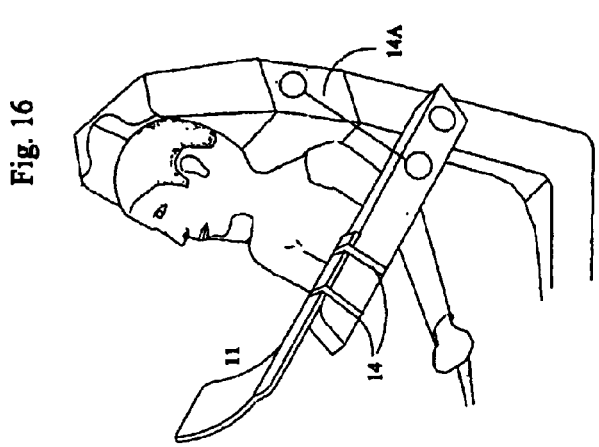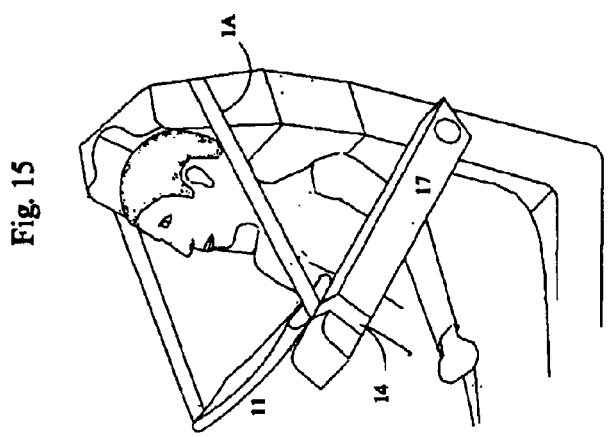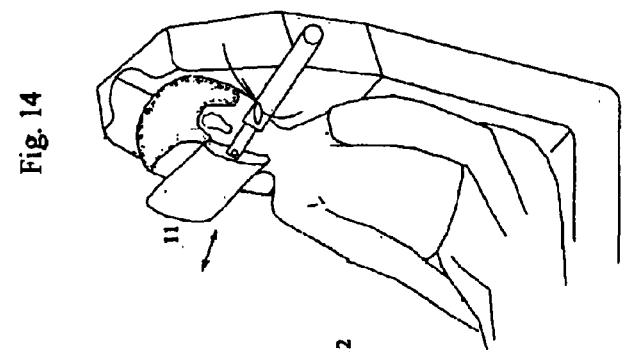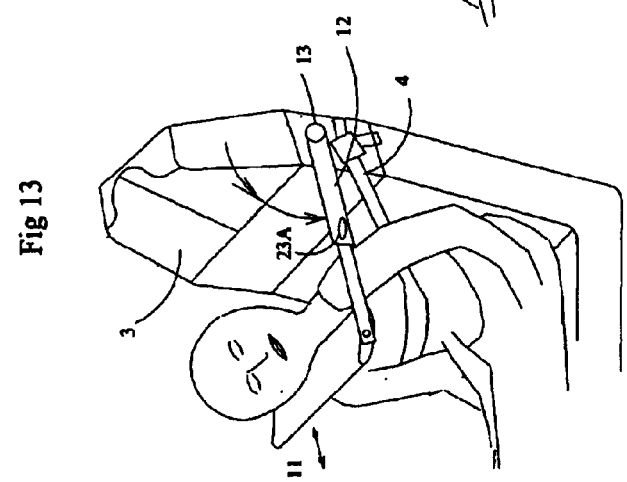

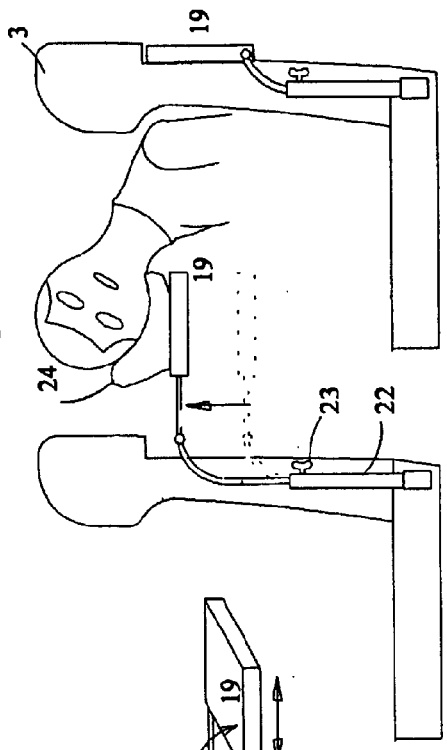
Fig 17
Fig 18
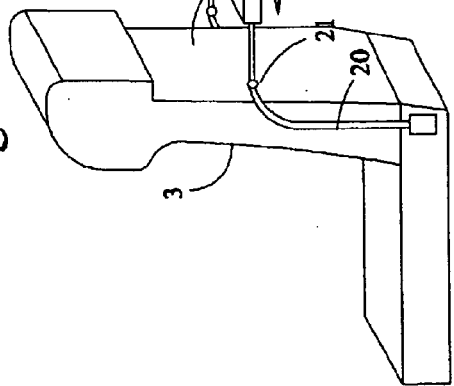
Fig. 19
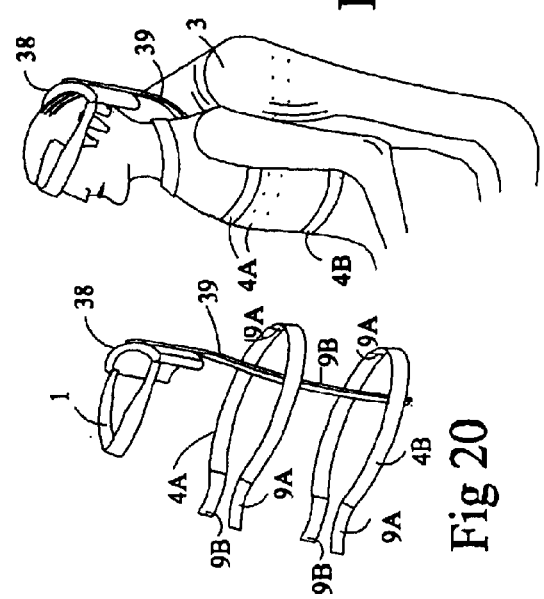
Fig. 21
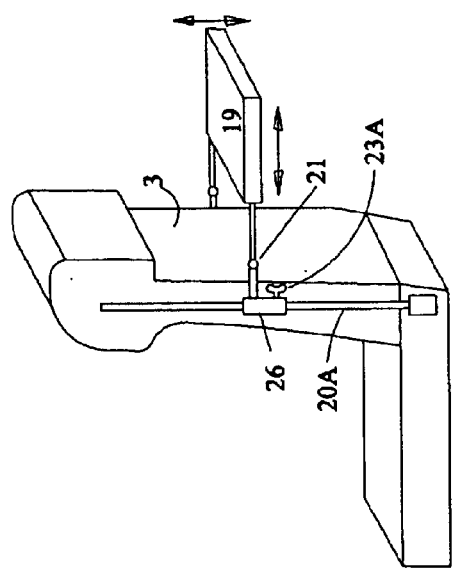
Fig 20

FACILITATE SLEEPING OF A PERSON IN SITTING POSITION BY SUPPORTING THE HEAD AND/OR BODY

BACKGROUND

1. Field of Invention

This invention relates to facilitating sleeping of a person in sitting position.

2. Description—Problem

It is common to see travelers in plane, bus, and automobile, trying to sleep in chairs and seats, with their heads hanging forward or sideways. The Lean makes Sleeping difficult. Even when a person avoids the Lean, it often takes mental effort to do so, which again, makes Sleeping less restful.

DESCRIPTION—PRIOR ART

There are existing patents intended to improve the sleeping in the sitting position.

U.S. Pat. No. 5,611,601 by Cowgur describes Rest Pillow, which is inflated and the user wears it, places it on his lap, and rests his head on it. The device would be expensive and inflating is difficult for many.

U.S. Pat. No. 6,231,535 by Mainiero, et al. describes a head support for maintaining erect by wearing a specially curved surfaced device. It supports the head from bending forward. The device has complex curves and does not resist the sideways leans.

U.S. Pat. No. 4,161,946 by Zuesse shows complicated linkages to keep the head upright by transmitting the forehead pressure to chest. Again, nothing resists the sideway leans.

U.S. Pat. No. 5,505,523 by Wang describes a safety nap cushion, which requires properly curved inflatable cushion with reverse U-shaped back.

All four devices have two weaknesses. They need to be stored away when not used and they are more complex (expensive) to manufacture. Plus, three of the four devices need to be inflated. Users may need assistance in inflating. It would be very difficult to assist a large number of travelers with inflate-deflate and storage.

U.S. Pat. No. 6,266,825, by Floyd, describes a 2-pc-strap to hold the user's head against the backrest. Floyd's invention is very similar to an important part of this invention except, it:

1. uses a 2-piece strap with (loop-hook type) adhesive surfaces,
2. uses non-resilient web only,
3. holds the head in only one position, against the backrest,
4. does not provide body support or head support in a forward leaning position.

FEDERALLY SPONSORED RESEARCH OR DEVELOPMENT

Not Applicable. No federally sponsored fund or any other support was used.

SUMMARY OF INVENTION

This invention is valuable because most chairs do not recline to near horizontal position for sleeping, as in commercials for the business class and the first class air passengers.

The primary objective is to facilitate Sleeping, in the limitation of the chair and the space, by avoiding the Lean. It does it with simple and cost effective Straps and Headrests.

Straps and Headrest prevent the Lean in any one or both of the two ways.

A. Hold the head and/or the body at the backrest
B. Hold the head and/or the body in a forward leaning position.

OBJECTS AND ADVANTAGES

The strength and the uniqueness of my invention are its low cost, low weight and versatility. Straps provide supports to the head and the body at the backrest and in the forward leaning position. Modified food-trays allow resting of heads, economically, with very little change in design or weight or bulk. My embodiments do not use inflatable or complicated parts. They use simple or proven parts such as straps, pivots, telescopic tubes and existing parts such as food-trays, backrest, Armrests, pillows, and blankets.

In addition, the advantage in cost, weight, volume and maintenance, a vast majority of users would not require any assistance to use Straps and Headrests. Most of the embodiments do not need to be 'stored away' when not in use. The food-tray can be easily 'stored' as passengers have been doing. Similarly Straps can stay snugly fit to the chair without interfering with the chair's usage. These strengths make them uniquely suitable in large-scale installations in planes, buses and trains.

The first four inventions in Prior Art may need assistance to inflate and deflate or require storage or maintenance. This would make them unsuitable in large-scale applications because the demands they place on the service personnel. Straps, on the other hand, can be carried in purses and coat pockets. Thus, a user can bring it with him if the vehicle does not provide it.

The 2-piece strap of invention U.S. Pat. No. 6,266,825 by Floyd, with adhesive surfaces, is more complicated to make and to use than my one-piece elastic Head-strap in FIG. 3A. Floyd needs two pieces because 'non-resilient material' is used for straps. It cannot be stretched to fit over different sizes of backrests and heads. The highly stretchable elastic web in my strap makes the design simpler and it functions better. It allows some head movements while still holding the head against the backrest. Permitting movements make sleeping more restful. A non-resilient strap cannot do so unless it is kept loose. Loose strap, however, tends to slide down and does not function as good. In addition, Floyd's invention does not support the head in a forwarding leaning position.

The only item that needs storage and simple instructions is Extender, shown in FIG. 20. It facilitates Sleeping even when the backrest is too low and/or for tall users. It thus expands the scope of this invention.

Inventions in Prior Art would appeal to some individuals. This invention has much stronger appeal especially for large-scale applications because of its low cost, ease of use and storage, and versatility. The extreme low weight and volume make it particularly attractive for use in planes.

Additional benefit of the invention is to reduce sound to ears and light to eyes to help in Sleeping.

Another objective of this invention is to improve safety of the Sleeping person in case of sudden change in speed direction by restraining mobility of the user.

All these advantages of my inventions will become more apparent with the ensuing description and the accompanied figures.

BRIEF DESCRIPTION OF DRAWINGS

FIG. 1 shows a chair with the simple elastic Head-strap installed but not in use.

FIG. 2 shows the chair and the Head-strap in use, to avoid the head Lean.

FIG. 3A shows Head-strap and 3B shows Sleeve that slides over the Head-strap.

FIG. 4 shows a chair with an adjustable-length Head-strap, earplugs and a Body-strap.

FIG. 5 shows the Head-strap, the Body-strap and earplugs in use.

FIG. 6 shows Straps used in forward leaning positions of the head and the body.

FIG. 7 shows the Head-strap used as Chinstrap.

FIG. 8 shows enlarged earplug with a loop for positioning flexibility on the Head-strap.

FIG. 9 shows a backrest-cover with straps to form a new type of Head-strap.

FIG. 10 shows the Head-strap of FIG. 9 in use.

FIG. 11A shows a Headrest comprised two walls, hinged.

FIG. 11B shows the Headrest with a person in a chair, the walls in closed position.

FIG. 12A shows the Headrest with the walls in opened position.

FIG. 12B shows the Headrest, in use with walls in opened position.

FIG. 13 shows a pivoted, telescopic Headrest.

FIG. 14 shows the Headrest, shortened to press the head against the backrest.

FIG. 15 shows Headrest—Head-strap combined.

FIG. 16 shows a L-shaped Headrest tied to the Armrest.

FIG. 17 shows a food-tray commonly used in airlines.

FIG. 18 shows a person resting on a soft pillow over the raised food-tray.

FIG. 19 shows another way to raise the food-tray, using a pivot that slides.

FIG. 20 shows Extender, a head support, usable even when the backrest is too low.

FIG. 21 shows Extender in use with both bottom straps tied to the body.

LIST OF REFERENCED NUMERALS 1, 1A Head-straps
2 Sleeve
3 Chair
4, 4A, 4B Body-straps
5 Excess Lengths of straps
6 Earplugs
7 Buckles used with straps to adjust the strap length
8 Cloth used as backrest cover
9A, 9B Mating Loop surfaces, sticks to each other.
11, 11A Headrest
12 A pivoted telescopic arm
13 A ratchet type pivot, lockable in a desired angular position
14, 14A Straps
17 Armrest
19 Food-tray, commonly used in airline seats
20 An existing bar with the food-tray pivot at the top
20A A modified version of bar 20
21 Pivot for food-tray 19
22 Telescopic tube to allow the Food-tray to move up and down
23, 23A Wing nuts
24 A pillow placed over the food-try to rest one's head.
26 A tube attached to pivot 21. It slides on bar 20A.
34 Hinged wall of Headrest in FIGS. 11 and 12
35 Fixed wall of Headrest in FIGS. 11 and 12
36 Spring to bias wall 34 to collapse inward as in FIG. 11A
38 Head-support; see Extender (FIGS. 20, 21), for tall users.
39 A thin resilient bar attached to Head-support 38.

DESCRIPTION OF INVENTION

FIGS. 1, 2, 3A, 3B, 17, 18, 19—Preferred Embodiments

Head-strap 1 (FIGS. 1, 2, 3A, 3B) to hold head at backrest 3; and food-tray 19 (FIGS. 17, 18, 19) for head support in a forward leaning positions; are the two Preferred Embodiments.

FIG. 1 shows a chair with a Head-strap 1 on backrest 3. Sleeve 2, washable, could be lined with soft materials. Head-strap 1 is made of elastic web, could be coated with high friction material to resist slipping on backrest 3.

FIG. 2 shows Head-strap 1 in use. The elastic web permits the head movements while holding head against backrest 3.

FIG. 3A shows Head-strap 1 by itself

FIG. 3B shows the enlarged view of material for Sleeve 2, with the loop and hook surfaces 9A and 9B. Sleeve 2 is formed it by folding it so that tabs 9A and 9B stick to each other. Sleeve 2 materials may have varying degree of firmness.

FIG. 17 shows a chair with Food-tray 19 on the back of backrest 3. Bar 20 holds pivot 21 of food-tray 19. Food-tray 19 pivots to horizontal position and it can slide horizontally.

FIG. 18 shows bar 20 slides in telescopic tube 22. Tray 19 locked in the raised position with wing nut 23. Pillow 24 is on tray 19 and the user rests his head on it.

FIG. 19 shows another way to provide the vertical positioning ability to food-tray 19. Instead of telescopic tube 22, it uses bar 20A with the sliding tube 26.

FIGS. 4 to 16 and 20 to 21—Other Embodiments

FIG. 4 shows backrest 3 with two straps and additional features. Both have movable Sleeve 2 along the length of straps. Top one also has two earplugs 6. Each strap has a buckle 7 for the length adjustment. The extra lengths 5, hang from the side. The top strap is Head-strap 1 and the bottom is Body-strap 4.

FIG. 5 shows both straps in use. Lengths 5 are shorter than they were in FIG. 4. Earplugs 6 are also used, though not visible, to shield the noise.

FIG. 6 shows that lengthened straps 1 and 4 are used in forward leaning position. Head strap 1 supports the user's arms and head and Body-strap 4 supports the body. Note that excess lengths 5 are shorter.

FIG. 7 shows Head-strap 1 used as the Chinstrap.

FIG. 8 shows enlarged earplug 6 with a loop to make it movable on Head-strap 1.

FIG. 9 shows a back-cover cloth 8 with a strap 1A to form a new type of Head-strap.

FIG. 10 shows Head-strap of FIG. 9 in use.

FIG. 11A Headrest made of wall 34 and wall 35. These walls are hinged and biased to stay closed with a spring 36.

FIG. 11B shows Headrest of FIG. 11A with a person and a chair. The person can lean against the Headrest.

FIG. 12A shows the Headrest of FIG. 11A in opened position.

FIG. 12B shows Headrest of FIG. 12A with a person and a chair. It provides side and front support against the Lean. The lining of the Headrest of FIG. 11 is not shown to avoid crowding.

FIG. 13 shows pivoted cantilevered Headrest 11. A ratchet pivot 13 is lockable in a desired angular position. Headrest 11 can move close or far with telescopic tube 12. Wing nut 23A on the tube 12 locks Headrest 11 at a desired distance. When not used, Headrest 11 is kept at the top of backrest 3. It also shows Body-strap 4.

FIG. 14 shows Headrest 11 holds the head against backrest 3 by changing the angular position and the radial distance. Headrest 11 also pivots on its own axis.

FIG. 15 uses a modified Head-strap 1 with Headrest 11 in front. Headrest 11 is attached to Armrest 17 with strap 14. The attachment to Armrest 17 reduces the swing of Headrest 11. Here, no modification in the chair is needed.

FIG. 16 shows a new type of Headrest 11 strapped to Armrest 17. A strap 14A keeps Armrest 17 in the desired angular position.

FIG. 20 shows Extender, an embodiment usable even when backrest 3 is too low. Head Support 38 is attached to a thin resilient bar 38. Straps 4A and 4B are detachably attached to bar 39 with loop-hook surfaces 9A and 9B.

FIG. 21 shows Extender of FIG. 20 in use with both Straps 4A and 4B encircling the body of the user. It also shows an alternate use of strap 4A, by dashed lines, which encircles the body and backrest 3.

Operation of Invention

The primary objective of the invention is to facilitate Sleeping, in the limitation of the chair and the space, by avoiding the Lean to uncomfortable position. It does so by using Straps and Headrests.

The forces that cause the head and or the body to lean are small. Thus, resisting the Lean does not need materials or structures of great strengths. Thus, embodiments such as Extender, straps and Headrests can be light.

The simplest, lightest and yet effective is Head-strap 1 in FIG. 3A. It holds the head against backrest 3 while still permitting movements. It is usable by persons of different heights within a good range. It is easy to use, easy to maintain and does not require removal when not in use. Sleeve 2 can be lined with soft materials to make it more comfortable. It shields the light. A part of the elastic web may be lined with high friction lining to resist slippage on backrest 3. The web is very stretchable and therefore fits a wide range of backrests and heads. A wider range can be obtained by using a long open elastic web with loop-hook fasteners at ends, or using buckles or buttons. Thus, different size loops can be formed from the same web, as done in Body-trap 4.

FIG. 3A shows Head-strap 1 by itself. FIG. 3B shows Sleeve material, foldable into Sleeve 2, with the loop and hook pads 9A and 9B sticking to each other as shown.

FIGS. 5, 6, and 7 shows Straps 1 and 4, shown in FIG. 4, used in various ways.

FIG. 8 shows enlarged view of earplug 6 with a loop to make it movable along strap 1.

FIGS. 9 and 10 show that head-straps can look very different. Here, backrest-cover 8, with strap 1A holds the head against backrest 3. This gives dual use to cover 8.

FIGS. 11 (A, B) shows a headrest with 2 walls, which supports the head against sideway leans. FIGS. 12 (A, B) shows the same Headrest with wall 34 in opened position. Wall 34 holds the head against backrest 3. The headrest, in this position, supports the head against sideway and front leans. Wall 35 is attached the side of backrest 3 with loop-hook surfaces 9A and 9B. The Headrest can be repositioned on the loop surface 9A.

FIG. 13 shows a Headrest 11 with pivoted telescopic arm 12. The pivot 13 is of ratchet type, lockable in a desired angular position. In addition, Headrest 11 turns on its own axis. With these features, Headrest 11 is used in forward leaning position in FIG. 13.

FIG. 14 shows that the Headrest 11 holds the head against backrest 3.

FIG. 15 shows strap 1 combined with Headrest 11. The combination is attached to Armrest 17 with a strap to reduce the swing of Headrest 11. Armrest 17 does not have to be raised. The combination can be attached to Armrest 17 in lowered position. This is important because some Armrests cannot be raised.

FIG. 16 shows a simpler type of Headrest 11. It is attached to Armrest 17 by straps 14. Strap 14A holds it in at a desired angle, which would not be needed with a ratchet type pivot. Headrest 11 can be tied on top or the bottom of Armrest 17, giving flexibility of the distance. Headrest 11 can press the head against backrest 3 by further tilting Armrest 17 upward (by shortening strap 14A).

Food-trays used in airlines can double as a headrest. The food-tray, or a headrest supported from the backrest 3 of the seat in front can provide a neat way to support the head in a forward leaning position.

FIG. 17 is perspective view of backrest 3 with food-tray 19. Bar 20 supports food-tray pivot 21. Bar 20 is on the base of the chair and does not move when the chair is reclined. Thus, food-tray 19 does not move when the front chair is reclined or brought in upright position. For non-reclining chairs, going to the base to support pivot 21 would be unnecessary. The frame of backrest 3 can be used to install pivot 21 (FIG. 18) or a shorter version of bar 20A (FIG. 19).

FIG. 18 shows telescopic tube 22 with sliding bar 20. Food-tray 19 height can bow be raised. This change is simple and provides a cost-effective way to support the head in a forward leaning position.

FIG. 19 shows another way to adjust the height of food-tray 19. Bar 20A is a modified version of bar 20. Tube 26, slides on bar 20A. Thus, pivot 21 attached to tube 26, and therefore tray 19 gets the vertical positioning ability.

Extender (FIGS. 20 and 21), usable even when backrest is low, is made of a resilient thin bar 39 with three straps (1, 4A, 4B) and a head-support Pad 38. Backside of bar 39 has loop surface 9B so that straps 4A and 4B can be detachably attached.

A user attaches Extender to himself with Straps 4A and 4B in FIG. 21. Extender, while not rigid, keeps the head from leaning into uncomfortable positions. FIG. 21 also shows an alternative use of strap 4A, shown by dashed lines, encircling the user and backrest 3. Thus, both leans, the head lean and the body lean, are prevented.

Summarizing, the Body and the Head are Held in Two Different Positions:

Position A: Hold the head and/or the body at backrest 3. Examples of Straps (1 and 4) used this way are in FIGS. 2, 5, 7, and 10. The strap length, when applicable, is adjusted by buckles 7. The proper length and elasticity flexibly holds the head at backrest 3. Examples of Headrest 11, used this way, are in FIGS. 12B and 14. Headrest 11 of FIGS. 15 and 16 can also hold the head at backrest 3 by further tilting Armrest 17 upward.

Position B: Hold the head and/or the body in forward leaning position. FIGS. 6 and 15 show Strap 1; while FIGS. 13, 15, and 16 show Headrest 11 used this way. FIGS. 18 and 19 show food-tray 19 is used as headrest by making its height adjustable. If food-tray 19 does not exist, a similar embodiment can be added to the backrest 3.

I claim use of:

1. A vehicle seat having a seat base and a reclinable backrest attached thereto, further comprising a tray table which is located behind the backrest and which is mounted to a rear section of the seat base by a mounting means, wherein the position of the tray is unaffected by the reclining movement of the backrest relative to the seat base; the mounting means includes a pair of vertically oriented upright posts which are fixedly mounted to the rear section of the seat base and extend along the sides of the backrest when in its upright position; a corresponding pair of support members are slidably attached to said upright posts, the support members supporting the tray for allowing the tray to be adjusted vertically relative to the vehicle seat.

2. A vehicle seat in accordance with claim 1, wherein each of said upright posts comprises a hollow tube into which the support member slidably extends, and further comprising a locking element for securing each support member within the hollow tube at a selected vertical position.

3. A vehicle seat in accordance with claim 1, wherein the mounting means further comprises a pair of engagement elements which are slidably mounted on the upright posts and to which the support members are fixedly attached, and further comprising a locking element for fixedly securing each engagement element in a selected vertical position on the upright post.

* * * * *